(12) United States Patent
Takiguchi et al.

(10) Patent No.: US 6,352,202 B2
(45) Date of Patent: *Mar. 5, 2002

(54) METHOD AND SYSTEM FOR CONTROLLING CONTACTLESS IC CARDS

(75) Inventors: Masahiro Takiguchi, Anjo; Kiyoshi Takahashi, Hekinan; Tatsuya Hirata, Anjo; Shigeru Date, Tokyo; Hisanobu Dobashi, Tokyo; Shinji Nishimura, Tokyo; Kimiaki Ando, Tokyo; Tadashi Sato, Hadano; Hiromi Sato, Shiroishi; Toru Miura, Tokyo, all of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,412

(22) Filed: Jan. 12, 1999

(30) Foreign Application Priority Data

Jan. 12, 1998 (JP) ............................................. 10-004232

(51) Int. Cl.$^7$ .............................. G06K 7/08; H04Q 5/22
(52) U.S. Cl. ....................... 235/451; 235/492; 340/10.1; 340/10.31; 340/10.42; 340/10.51; 340/10.52
(58) Field of Search ............................... 235/375, 382.5, 235/492, 487, 451; 340/10.32, 825.52, 825.53, 825.07

(56) References Cited

U.S. PATENT DOCUMENTS

| | | | |
|---|---|---|---|
| 4,638,313 A | * | 1/1987 | Sherwood, Jr. et al. . 340/825.52 |
| 4,691,202 A | * | 9/1987 | Denned et al. ........ 340/825.54 |
| 4,748,320 A | * | 5/1988 | Yorimoto et al. ........... 235/492 |
| 5,216,419 A | * | 6/1993 | Fujisaka et al. ....... 340/825.54 |
| 5,477,215 A | * | 12/1995 | Mandelbaum ......... 340/825.34 |
| 5,530,896 A | * | 6/1996 | Gilbert ........................ 395/829 |
| 5,541,928 A | | 7/1996 | Toyama et al. ........ 340/825.52 |
| 5,630,167 A | * | 5/1997 | Hosokawa .................. 395/823 |
| 5,708,831 A | * | 1/1998 | Schon ........................ 395/800 |
| 5,856,788 A | * | 1/1999 | Walter et al. .............. 340/10.2 |
| 5,917,422 A | * | 6/1999 | Adamec et al. ........ 340/825.35 |
| 5,936,540 A | * | 8/1999 | Lebet .................... 340/825.07 |
| 5,936,544 A | * | 8/1999 | Gonzales et al. ...... 340/825.34 |
| 5,940,006 A | * | 8/1999 | MacLellan et al. .... 340/825.54 |

FOREIGN PATENT DOCUMENTS

| | | |
|---|---|---|
| EP | 0 709 803 | 5/1996 |
| JP | 3-238935 | 10/1991 |
| JP | 4362797 | 12/1992 |
| JP | 8-315097 | 11/1996 |

* cited by examiner

Primary Examiner—Michael G. Lee
Assistant Examiner—Jamara Franklin
(74) Attorney, Agent, or Firm—Pillsbury Winthrop

(57) ABSTRACT

A reader/writer (RW) requires identification information pieces of respective plural IC cards (A, B, C). The plural IC cards return the respective identification information pieces in response to the requirement by the reader/writer. Logical addresses are assigned to some IC cards among the plural IC cards respectively to cause the reader/writer to select them in response to the return of the identification information pieces by the plural IC cards. The IC cards selected by the reader/writer are controlled. The reader/writer cancels the assignment of the logical address to one of the selected IC cards. The logical address, the assignment of which has been canceled by the reader/writer, is assigned to an IC card among the plural IC cards to which any logical address has not been assigned yet. The IC card to which the logical address has just been assigned is controlled.

3 Claims, 7 Drawing Sheets

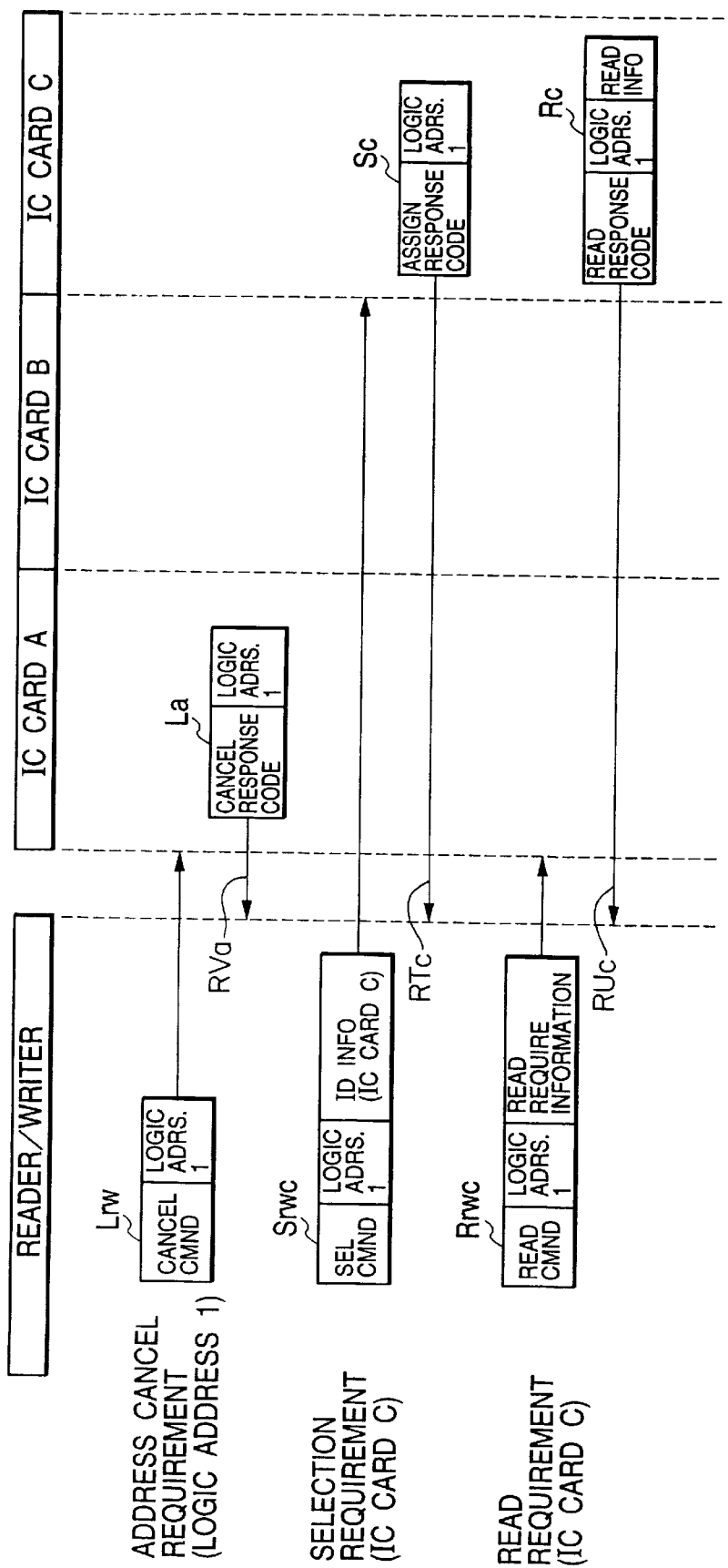

METHOD AND SYSTEM FOR CONTROLLING CONTACTLESS IC CARDS

BACKGROUND OF THE INVENTION

1. Field of the Invention

This invention relates to a system for controlling contactless IC (integrated circuit) cards. This invention also relates to a method of controlling contactless IC cards.

2. Description of the Related Art

In a prior-art contact IC card control system, IC cards communicate with readers/writers when being inserted thereinto. In each of the readers/writers, the type of an IC card placed thereinto is detected as follows. When the IC card is reset, for example, when the IC card is subjected to a power-on resetting process, the IC card transmits a reset notice to a reader/writer. The reset notice contains information of the type of the IC card. The reader/writer identifies or detects the type of the IC card in response to the reset notice transmitted from the IC card. Then, the reader/writer implements the following processes related to the identified IC card. First, the reader/writer assigns a logical address to the IC card in accordance with the identified type thereof. Second, the reader/writer controls the reading and the writing of information from and into the IC card in response to the logical address. The assignment of the logical address to the IC card is canceled when the IC card is reset by turning off the power supply.

In a contactless IC card control system, a reader/writer has a communication service area (a communication coverage). The reader/writer can communicate with an IC card or IC cards in the communication service area by radio.

In a conceivable contactless IC card control system, a reader/writer assigns different logical addresses to respective IC cards in its communication service area. The reader/writer feeds power to the IC cards by radio. When the power supply of the reader/writer is turned off, power feed to all the IC cards is suspended so that the assignment of the logical addresses thereto is canceled at once. Accordingly, in the conceivable contactless IC card control system, it is difficult to cancel the assignment of the logical address to one of the IC cards. In addition, it is difficult to control IC cards, the number of which exceeds the number of usable logical addresses.

Generally, as the number of different logical addresses increases, the number of bits representing each logical address increases. An increase in the number of address-representing bits is disadvantageous to signal processing which includes address processing.

SUMMARY OF THE INVENTION

It is a first object of this invention to provide a system for controlling contactless IC (integrated circuit) cards which can cancel the assignment of a logical address to one of the IC cards.

It is a second object of this invention to provide a method of controlling contactless IC (integrated circuit) cards which can cancel the assignment of a logical address to one of the IC cards.

It is a third object of this invention to provide a system for controlling contactless IC (integrated circuit) cards, the number of which exceeds the number of usable logical addresses.

It is a fourth object of this invention to provide a method of controlling contactless IC (integrated circuit) cards, the number of which exceeds the number of usable logical addresses.

A first aspect of this invention provides a contactless IC card control system comprising first means (200) for causing a reader/writer (RW) to require identification information pieces of respective plural IC cards (A, B, C); second means (310) for causing the plural IC cards to return the respective identification information pieces in response to the requirement by the first means; third means (212, 213, 220, 230, 320) for assigning logical addresses to some IC cards among the plural IC cards respectively to cause the reader/writer to select the some IC cards among the plural IC cards in response to the return of the identification information pieces by the second means; fourth means (240, 241, 250, 340, 370) for controlling the some IC cards selected by the reader/writer; fifth means (260, 261, 360) for causing the reader/writer to cancel the assignment of the logical address to one of the some IC cards; sixth means (262, 263, 320, 330) for assigning the logical address, the assignment of which has been canceled by the fifth means, to an IC card among the plural IC cards to which any logical address has not been assigned yet; and seventh means (264, 340, 370) for controlling the IC card to which the logical address has been assigned by the sixth means.

A second aspect of this invention provides a method of controlling contactless IC cards which comprises the steps of causing a reader/writer (RW) to require identification information pieces of respective plural IC cards (A, B, C); causing the plural IC cards to return the respective identification information pieces in response to the requirement by the reader/writer; assigning logical addresses to some IC cards among the plural IC cards respectively to cause the reader/writer to select the some IC cards among the plural IC cards in response to the return of the identification information pieces by the plural IC cards; controlling the some IC cards selected by the reader/writer; causing the reader/writer to cancel the assignment of the logical address to one of the some IC cards; assigning the logical address, the assignment of which has been canceled by the reader/writer, to an IC card among the plural IC cards to which any logical address has not been assigned yet; and controlling the IC card to which the logical address has been assigned by the immediately-preceding step.

A third aspect of this invention provides a contactless IC card control system comprising first means for assigning a first logical address to a first IC card; second means for assigning a second logical address to a second IC card, the second logical address differing from the first logical address, the second IC card differing from the first IC card; third means for canceling the assignment of the first logical address to the first IC card while maintaining the assignment of the second logical address to the second IC card; and fourth means for, after the assignment of the first logical address to the first IC card is canceled by the third means, assigning the first logical address to a third IC card which differs from the first and second IC cards.

A fourth aspect of this invention provides a contactless IC card control system comprising first means for assigning a first logical address to a first IC card; second means for assigning a second logical address to a second IC card, the second logical address differing from the first logical address, the second IC card differing from the first IC card; third means for controlling the first IC card in response to the first logical address; fourth means for, after the third means controls the first IC card, canceling the assignment of the first logical address to the first IC card while maintaining the assignment of the second logical address to the second IC card; and fifth means for, after the assignment of the first logical address to the first IC card is canceled by the fourth means, assigning the first logical address to a third IC card which differs from the first and second IC cards.

A fifth aspect of this invention is based on the fourth aspect thereof, and provides a contactless IC card control system further comprising sixth means for, after the fifth means assigns the first logical address to the third IC card, controlling the third IC card in response to the first logical address.

A sixth aspect of this invention is based on the fourth aspect thereof, and provides a contactless IC card control system further comprising sixth means for controlling the second IC card in response to the second logical address.

BRIEF DESCRIPTION OF THE DRAWINGS

FIGS. 7 and 8 are diagrams of signals transmitted between the reader/writer and IC cards in FIG. 1.

DESCRIPTION OF THE PREFERRED EMBODIMENT

Figure 1:
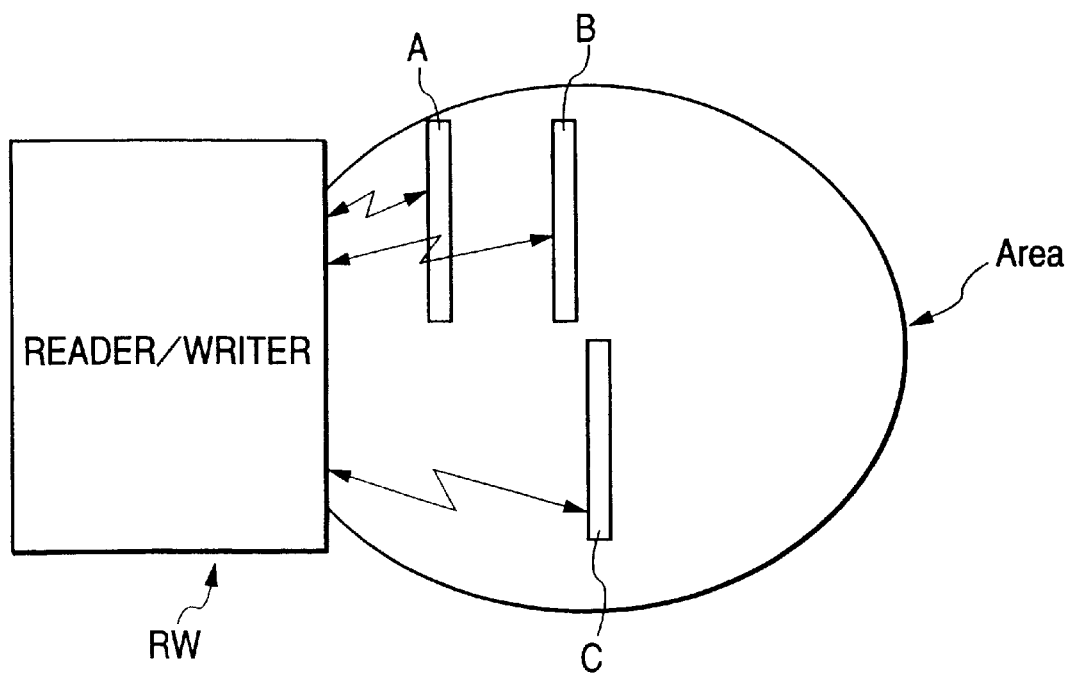
FIG. 1 is a diagram of a contactless IC card control system according to an embodiment of this invention.

With reference to FIG. 1, a contactless IC card control system includes a reader/writer RW provided on, for example, a telephone set. A given communication service area (a given communication coverage) provided by the reader/writer RW extends therefrom. Under exemplary conditions shown in FIG. 1, three IC cards "A", "B", and "C" are placed in the communication service area. For example, the IC cards "A", "B", and "C" are prepaid cards for using a telephone set. The reader/writer RW can communicate with the IC cards "A", "B", and "C" by radio.

Figure 2:
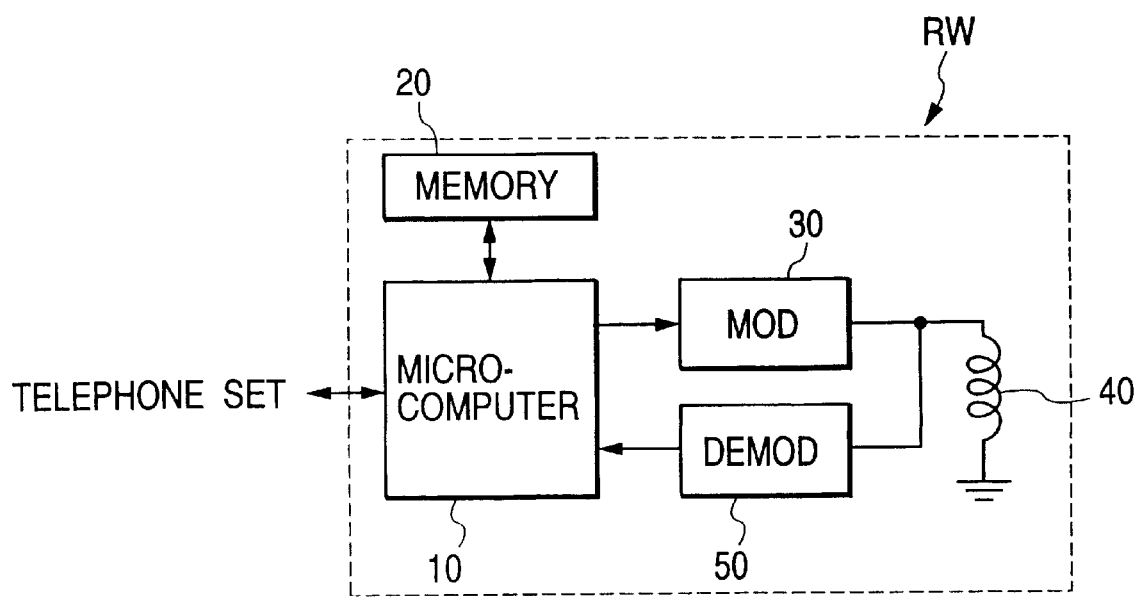
FIG. 2 is a block diagram of an electrical portion of a reader/writer in FIG. 1.

As shown in FIG. 2, the reader/writer RW includes a microcomputer 10, a memory 20, a modulation circuit 30, an antenna 40, and a demodulation circuit 50. The modulation circuit 30 and the demodulation circuit 50 are connected to the antenna 40. The microcomputer 10 is connected to the memory 20, the modulation circuit 30, and the demodulation circuit 50. The microcomputer 10 is electrically connected to, for example, a telephone set.

The microcomputer 10 includes a combination of an input/output port, a CPU, a ROM, and a RAM. The microcomputer 10 operates in accordance with a program stored in the ROM. The program has a first segment for implementing radio communications with each IC card placed in the communication service area. The program has a second segment for detecting or identifying the type of each IC card. The program has a third segment for assigning a logical address to each IC card. The program has a fourth segment for canceling the assignment of a logical address to a designated IC card. The program has a fifth segment for controlling each IC card.

The memory 20 is previously loaded with data representing at least two different logical addresses (that is, a logical address "1" and a logical address "2"). The memory 20 can be accessed by the microcomputer 10.

The modulation circuit 30 receives output data (a baseband signal) from the microcomputer 10. The modulation circuit 30 subjects the output data from the microcomputer 10 to modulation, thereby converting the data (the baseband signal) into a radio signal. The modulation circuit 30 outputs the radio signal to the antenna 40. The radio signal is radiated by the antenna 40.

A radio signal coming from each IC card in the communication service area is received by the antenna 40. The received radio signal is fed from the antenna 40 to the demodulation circuit 50. The demodulation circuit 50 subjects the received radio signal to demodulation, thereby recovering baseband data therefrom. The demodulation circuit 50 outputs the recovered data to the microcomputer 10.

Figure 3:
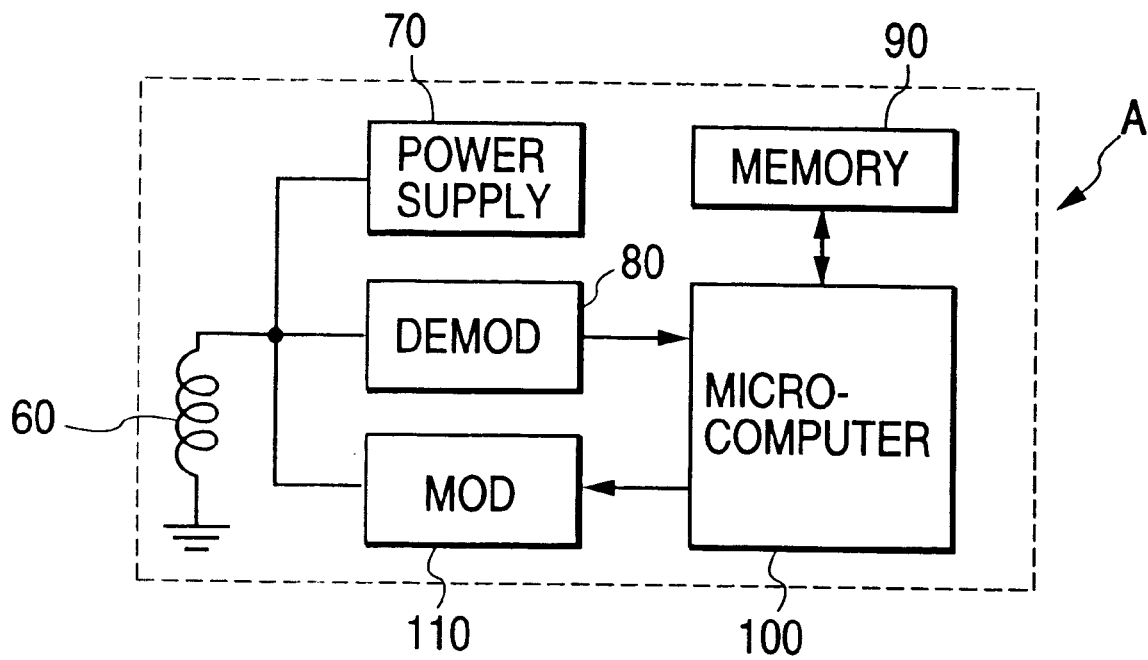
FIG. 3 is a block diagram of an electrical portion of an IC card in FIG. 1.

The IC cards "A", "B", and "C" are similar in structure. Accordingly, only the structure of the IC card "A" will be explained in detail. As shown in FIG. 3, the IC card "A" includes an antenna 60, a power supply circuit 70, a demodulation circuit 80, a memory 90, a microcomputer 100, and a modulation circuit 110. The antenna 60 is connected to the power supply circuit 70, the demodulation circuit 80, and the modulation circuit 110. The microcomputer 100 is connected to the demodulation circuit 80, the memory 90, and the modulation circuit 110.

A radio signal coming from the reader/writer RW is received by the antenna 60. The received radio signal is fed from the antenna 60 to the power supply circuit 70 and the demodulation circuit 80. The power supply circuit 70 generates DC power from the received radio signal, and stores the generated DC power. In addition, the power supply circuit 70 feeds the DC power to the demodulation circuit 80, the memory 90, the microcomputer 100, and the modulation circuit 110 to activate them.

The demodulation circuit 80 subjects the received radio signal to demodulation, thereby recovering baseband data therefrom. The demodulation circuit 80 outputs the recovered data to the microcomputer 100.

The memory 90 is previously loaded with IC-card identification data or IC-card identification information (IC-card ID information). Specifically, the IC-card ID information includes data representing an ID code word corresponding to a type of the related IC card (the IC card "A"), and data representing parameters of the related IC card (the IC card "A"). The memory 90 can be accessed by the microcomputer 100.

The microcomputer 100 includes a combination of an input/output port, a CPU, a ROM, and a RAM. The microcomputer 100 operates in accordance with a program stored in the ROM. The program has a segment for implementing radio communications with the reader/writer RW.

The modulation circuit 110 receives output data (a baseband signal) from the microcomputer 100. The modulation circuit 110 subjects the output data from the microcomputer 100 to modulation, thereby converting the data (the baseband signal) into a radio signal. The modulation circuit 110 outputs the radio signal to the antenna 60. The radio signal is radiated by the antenna 60.

The IC card "B" is similar to the IC card "A" except that the memory 90 in the IC card "B" stores data representing an ID code word corresponding to a type of the IC card "B", and data representing parameters of the IC card "B". The IC card "C" is similar to the IC card "A" except that the memory 90 in the IC card "C" stores data representing an ID code word corresponding to a type of the IC card "C", and data representing parameters of the IC card "C".

The program in the microcomputer 100 of the IC card "B" is similar to that in the microcomputer 100 of the IC card "A". In addition, the program in the microcomputer 100 of the IC card "C" is similar to that in the microcomputer 100 of the IC card "A".

The contactless IC card control system operates as follows. It is assumed that as shown in FIG. 1, the IC cards "A", "B", and "C" exist in the communication service area provided by the reader/writer RW.

In the reader/writer RW, the microcomputer 10 outputs a signal Drw (see FIG. 7) of a requirement for IC-card ID information to the modulation circuit 30. The modulation circuit 30 converts the ID information requirement signal Drw into a corresponding command radio signal referred to as a first command radio signal. The modulation circuit 30 outputs the first command radio signal to the antenna 40.

The first command radio signal is radiated by the antenna 40, being transmitted from the reader/writer RW to the IC cards "A", "B", and "C".

In each of the IC cards "A", "B", and "C", the first command radio signal is received by the antenna 60. The received first command radio signal is fed from the antenna 60 to the demodulation circuit 80. The demodulation circuit 80 recovers the ID information requirement signal Drw from the received first command radio signal. The demodulation circuit 80 outputs the recovered ID information requirement signal Drw to the microcomputer 100.

In each of the IC cards "A", "B", and "C", the microcomputer 100 reads out the ID data from the memory 90 in response to the ID information requirement signal Drw, and generates an answer signal Da, Db, or Dc (see FIG. 7) from the readout data. The microcomputer 100 outputs the answer signal Da, Db, or Dc (see FIG. 7) to the modulation circuit 110. The answer signal Da, Db, or Dc contains the ID information of the related IC card.

Specifically, the answer signal Da outputted from the microcomputer 100 in the IC card "A" represents the ID code word corresponding to the IC card "A". The answer signal Db outputted from the microcomputer 100 in the IC card "B" represents the ID code word corresponding to the IC card "B". The answer signal Dc outputted from the microcomputer 100 in the IC card "C" represents the ID code word corresponding to the IC card "C".

In the IC card "A", the modulation circuit 110 converts the ID information answer signal Da into a corresponding radio answer signal RSa. The modulation circuit 110 feeds the radio answer signal RSa to the antenna 60. The antenna 60 radiates and transmits the radio answer signal RSa.

In the IC card "B", the modulation circuit 110 converts the ID information answer signal Db into a corresponding radio answer signal RSb. The modulation circuit 110 feeds the radio answer signal RSb to the antenna 60. The antenna 60 radiates and transmits the radio answer signal RSb.

In the IC card "C", the modulation circuit 110 converts the ID information answer signal Dc into a corresponding radio answer signal RSc. The modulation circuit 110 feeds the radio answer signal RSc to the antenna 60. The antenna 60 radiates and transmits the radio answer signal RSc.

The antenna 40 in the reader/writer RW receives the radio answer signals RSa, RSb, and RSc from the IC cards "A", "B", and "C". It is assumed that the radio answer signals RSa, RSb, and RSc are sequentially received by the reader/writer RW in that order. In the reader/writer RW, the received radio answer signals RSa, RSb, and RSc are fed from the antenna 40 to the demodulation circuit 50. The demodulation circuit 50 recovers the ID information answer signals Da, Db, and Dc from the radio answer signals RSa, RSb, and RSc, respectively. The demodulation circuit 50 outputs the recovered ID information answer signals Da, Db, and Dc to the microcomputer 10. In response to the recovered ID information answer signals Da, Db, and Dc, the microcomputer decides that IC cards are present in the communication service area, and answers to the ID information requirement have come therefrom. The recovered ID information answer signals Da, Db, and Dc represent the ID code words of the IC cards "A", "B", and "C", respectively. Accordingly, the demodulation circuit 50 informs the microcomputer 10 of the recovered ID code words of the IC cards "A", "B", and "C". The microcomputer 110 sets flags for the respective recovered ID code words. The microcomputer 10 uses each of the recovered ID code words as IC-card ID information. The microcomputer 10 writes signals (data) of the recovered ID code words into the memory 20 as IC-card ID information.

Figure 7:
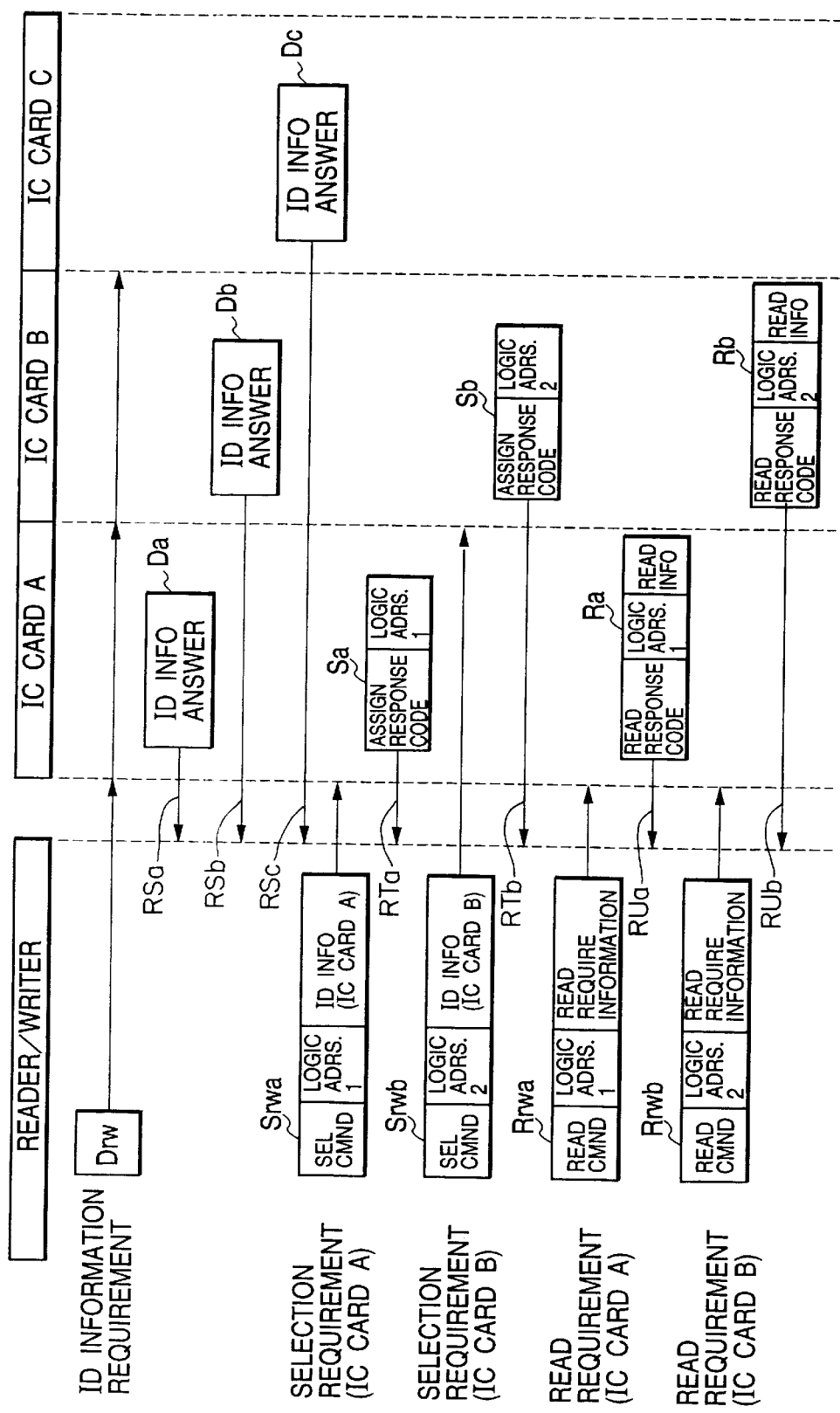

Subsequently, the microcomputer 10 in the reader/writer RW assigns the logical addresses "1" and "2" to the IC cards "A" and "B" as follows. The microcomputer 10 reads out the data from the memory 20 which represents the logical address "1" and the ID code word (the ID information) of the IC card "A". The microcomputer 10 generates a selection requirement signal Srwa for the IC card "A" in response to the readout data. As shown in FIG. 7, the selection requirement signal Srwa has a sequence of a selection command, the logical address "1", and the ID information of the IC card "A". The microcomputer 10 outputs the selection requirement signal Srwa to the modulation circuit 30. The modulation circuit 30 converts the selection requirement signal Srwa into a corresponding command radio signal referred to as a second command radio signal. The modulation circuit 30 outputs the second command radio signal to the antenna 40. The second command radio signal is radiated by the antenna 40, being transmitted from the reader/writer RW.

In the IC card "A", the second command radio signal is received by the antenna 60. The received second command radio signal is fed from the antenna 60 to the demodulation circuit 80. The demodulation circuit 80 recovers the selection requirement signal Srwa from the received second command radio signal. The demodulation circuit 80 outputs the recovered selection requirement signal Srwa to the microcomputer 100. The microcomputer 100 detects that the recovered selection requirement signal Srwa is directed to the IC card "A" on the basis of the ID information in the recovered selection requirement signal Srwa. In addition, the microcomputer 100 decides, from the recovered selection requirement signal Srwa, that the logical address "1" is assigned to the related IC card (the IC card "A"). The microcomputer 100 generates data representing that the logical address "1" is assigned to the related IC card (the IC card "A"). The microcomputer 100 writes the generated data into the memory 90. Furthermore, the microcomputer 100 generates an assignment answer signal Sa in response to the selection requirement signal Srwa. As shown in FIG. 7, the assignment answer signal Sa has a sequence of an assignment response code word and the logical address "1". The microcomputer 100 outputs the assignment answer signal Sa to the modulation circuit 110. The modulation circuit 110 converts the assignment answer signal Sa into a corresponding radio answer signal RTa. The modulation circuit 110 feeds the radio answer signal RTa to the antenna 60. The antenna 60 radiates and transmits the radio answer signal RTa.

The antenna 40 in the reader/writer RW receives the radio answer signal RTa from the IC card "A". In the reader/writer RW, the received radio answer signal RTa is fed from the antenna 40 to the demodulation circuit 50. The demodulation circuit 50 recovers the assignment answer signal Sa from the received radio answer signal RTa. The demodulation circuit 50 outputs the recovered assignment answer signal Sa to the microcomputer 10. The microcomputer 10 sets an assignment-indicating flag for the logical address "1" in response to the recovered assignment answer signal Sa. Specifically, the microcomputer 10 generates data representing that the logical address "1" has been assigned to the IC card "A". The microcomputer 10 writes the generated data into the memory 20.

Subsequently, the microcomputer 10 in the reader/writer RW reads out the data from the memory 20 which represents the logical address "2" and the ID code word (the ID information) of the IC card "B". The microcomputer 10 generates a selection requirement signal Srwb for the IC card "B" in response to the readout data. As shown in FIG. 7, the selection requirement signal Srwb has a sequence of the selection command, the logical address "2", and the ID information of the IC card "B". The microcomputer 10 outputs the selection requirement signal Srwb to the modulation circuit 30. The modulation circuit 30 converts the selection requirement signal Srwb into a corresponding command radio signal referred to as a third command radio signal. The modulation circuit 30 outputs the third command radio signal to the antenna 40. The third command radio signal is radiated by the antenna 40, being transmitted from the reader/writer RW.

In the IC card "B", the third command radio signal is received by the antenna 60. The received third command radio signal is fed from the antenna 60 to the demodulation circuit 80. The demodulation circuit 80 recovers the selection requirement signal Srwb from the received third command radio signal. The demodulation circuit 80 outputs the recovered selection requirement signal Srwb to the microcomputer 100. The microcomputer 100 detects that the recovered selection requirement signal Srwb is directed to the IC card "B" on the basis of the ID information in the recovered selection requirement signal Srwb. In addition, the microcomputer 100 decides, from the recovered selection requirement signal Srwb, that the logical address "2" is assigned to the related IC card (the IC card "B"). The microcomputer 100 generates data representing that the logical address "2" is assigned to the related IC card (the IC card "B"). The microcomputer 100 writes the generated data into the memory 90. Furthermore, the microcomputer 100 generates an assignment answer signal Sb in response to the selection requirement signal Srwb. As shown in FIG. 7, the assignment answer signal Sb has a sequence of the assignment response code word and the logical address "2". The microcomputer 100 outputs the assignment answer signal Sb to the modulation circuit 110. The modulation circuit 110 converts the assignment answer signal Sb into a corresponding radio answer signal RTb. The modulation circuit 110 feeds the radio answer signal RTb to the antenna 60. The antenna 60 radiates and transmits the radio answer signal RTb.

The antenna 40 in the reader/writer RW receives the radio answer signal RTb from the IC card "B". In the reader/writer RW, the received radio answer signal RTb is fed from the antenna 40 to the demodulation circuit 50. The demodulation circuit 50 recovers the assignment answer signal Sb from the received radio answer signal RTb. The demodulation circuit 50 outputs the recovered assignment answer signal Sb to the microcomputer 10. The microcomputer 10 sets an assignment-indicating flag for the logical address "2" in response to the recovered assignment answer signal Sb. Specifically, the microcomputer 10 generates data representing that the logical address "2" has been assigned to the IC card "B". The microcomputer 10 writes the generated data into the memory 20.

After both the logical addresses "1" and "2" have been assigned to the IC cards "A" and "B", the microcomputer 10 in the reader/writer RW implements steps of controlling the IC cards "A" and "B" as follows. The microcomputer 10 generates a read requirement signal Rrwa for the IC card "A". As shown in FIG. 7, the read requirement signal Rrwa has a sequence of a read command, the logical address "1", and read requirement information. The microcomputer 10 outputs the read requirement signal Rrwa to the modulation circuit 30. The modulation circuit 30 converts the read requirement signal Rrwa into a corresponding command radio signal referred to as a fourth command radio signal. The modulation circuit 30 outputs the fourth command radio signal to the antenna 40. The fourth command radio signal is radiated by the antenna 40, being transmitted from the reader/writer RW.

In the IC card "A", the fourth command radio signal is received by the antenna 60. The received fourth command radio signal is fed from the antenna 60 to the demodulation circuit 80. The demodulation circuit 80 recovers the read requirement signal Rrwa from the received fourth command radio signal. The demodulation circuit 80 outputs the recovered read requirement signal Rrwa to the microcomputer 100. The microcomputer 100 detects that the logical address represented by the recovered read requirement signal Rrwa agrees with the logical address "1" assigned to the related IC card (the IC card "A"). Thus, the microcomputer 100 recognizes that the recovered read requirement signal Rrwa is directed to the related IC card (the IC card "A"). Subsequently, the microcomputer 100 reads out data from the memory 90 in response to the read command and the read requirement information represented by the recovered read requirement signal Rrwa. Specifically, the readout data is designated by the read requirement information. The microcomputer 100 uses the readout data as read information. The microcomputer 100 generates a read answer signal Ra. As shown in FIG. 7, the read answer signal Ra has a sequence of a read response code word, the logical address "1", and the read information. The microcomputer 100 outputs the read answer signal Ra to the modulation circuit 110. The modulation circuit 110 converts the read answer signal Ra into a corresponding radio answer signal RUa. The modulation circuit 110 feeds the radio answer signal RUa to the antenna 60. The antenna 60 radiates and transmits the radio answer signal RUa.

The antenna 40 in the reader/writer RW receives the radio answer signal RUa from the IC card "A". In the reader/writer RW, the received radio answer signal RUa is fed from the antenna 40 to the demodulation circuit 50. The demodulation circuit 50 recovers the read answer signal Ra from the received radio answer signal RUa. The demodulation circuit 50 outputs the recovered read answer signal Ra to the microcomputer 10. The microcomputer 10 extracts the read information from the recovered read answer signal Ra. The microcomputer 10 writes the read information into the memory 20 as readout data.

Subsequently, the microcomputer 10 generates a read requirement signal Rrwb for the IC card "B". As shown in FIG. 7, the read requirement signal Rrwb has a sequence of the read command, the logical address "2", and read requirement information. The microcomputer 10 outputs the read requirement signal Rrwb to the modulation circuit 30. The modulation circuit 30 converts the read requirement signal Rrwb into a corresponding command radio signal referred to as a fifth command radio signal. The modulation circuit 30 outputs the fifth command radio signal to the antenna 40. The fifth command radio signal is radiated by the antenna 40, being transmitted from the reader/writer RW.

In the IC card "B", the fifth command radio signal is received by the antenna 60. The received fifth command radio signal is fed from the antenna 60 to the demodulation circuit 80. The demodulation circuit 80 recovers the read requirement signal Rrwb from the received fifth command radio signal. The demodulation circuit 80 outputs the recovered read requirement signal Rrwb to the microcomputer 100. The microcomputer 100 detects that the logical address represented by the recovered read requirement signal Rrwb agrees with the logical address "2" assigned to the related IC card (the IC card "B"). Thus, the microcomputer 100 recognizes that the recovered read requirement signal Rrwb is directed to the related IC card (the IC card "B"). Subsequently, the microcomputer 100 reads out data from the memory 90 in response to the read command and the read requirement information represented by the recovered read requirement signal Rrwb. Specifically, the readout data is designated by the read requirement information. The microcomputer 100 uses the readout data as read information. The microcomputer 100 generates a read answer signal Rb. As shown in FIG. 7, the read answer signal Rb has a sequence of the read response code word, the logical address "2", and the read information. The microcomputer 100 outputs the read answer signal Rb to the modulation circuit 110. The modulation circuit 110 converts the read answer signal Rb into a corresponding radio answer signal RUb. The modulation circuit 110 feeds the radio answer signal RUb to the antenna 60. The antenna 60 radiates and transmits the radio answer signal RUb.

The antenna 40 in the reader/writer RW receives the radio answer signal RUb from the IC card "B". In the reader/writer RW, the received radio answer signal RUb is fed from the antenna 40 to the demodulation circuit 50. The demodulation circuit 50 recovers the read answer signal Rb from the received radio answer signal RUb. The demodulation circuit 50 outputs the recovered read answer signal Rb to the microcomputer 10. The microcomputer 10 extracts the read information from the recovered read answer signal Rb. The microcomputer 10 writes the read information into the memory 20 as readout data.

After the steps of controlling the IC cards "A" and "B" have been completed, the microcomputer 10 cancels the assignment of the logical address "1" to the IC card "A" as follows. The microcomputer 10 generates an address cancel requirement signal Lrw for the IC card "A". As shown in FIG. 8, the address cancel requirement signal Lrw has a sequence of a cancel command and the logical address "1" which corresponds to an object to be canceled. The microcomputer 10 outputs the address cancel requirement signal Lrw to the modulation circuit 30. The modulation circuit 30 converts the address cancel requirement signal Lrw into a corresponding command radio signal referred to as a sixth command radio signal. The modulation circuit 30 outputs the sixth command radio signal to the antenna 40. The sixth command radio signal is radiated by the antenna 40, being transmitted from the reader/writer RW.

In the IC card "A", the sixth command radio signal is received by the antenna 60. The received sixth command radio signal is fed from the antenna 60 to the demodulation circuit 80. The demodulation circuit 80 recovers the address cancel requirement signal Lrw from the received sixth command radio signal. The demodulation circuit 80 outputs the recovered address cancel requirement signal Lrw to the microcomputer 100. The microcomputer 100 detects that the logical address represented by the recovered address cancel requirement signal Lrw agrees with the logical address assigned to the related IC card (the IC card "A"). Accordingly, the microcomputer 100 decides that the recovered address cancel requirement signal Lrw is directed to the related IC card (the IC card "A"). The microcomputer 100 cancels the assignment of the logical address "1" to the related IC card (the IC card "A") in response to the recovered address cancel signal Lrw. Specifically, the microcomputer 100 erases the data from the memory 90 which represents that the logical address "1" is assigned to the related IC card (the IC card "A"). In addition, the microcomputer 100 generates an address cancel answer signal La. As shown in FIG. 8, the address cancel answer signal La has a sequence of a cancel response code word and the logical address "1". The microcomputer 100 outputs the address cancel answer signal La to the modulation circuit 110. The modulation circuit 110 converts the address cancel answer signal La into a corresponding radio answer signal RVa. The modulation circuit 110 feeds the radio answer signal RVa to the antenna 60. The antenna 60 radiates and transmits the radio answer signal RVa.

The antenna 40 in the reader/writer RW receives the radio answer signal RVa from the IC card "A". In the reader/writer RW, the received radio answer signal RVa is fed from the antenna 40 to the demodulation circuit 50. The demodulation circuit 50 recovers the address cancel answer signal La from the received radio answer signal RVa. The demodulation circuit 50 outputs the recovered address cancel answer signal La to the microcomputer 10. The microcomputer 10 resets the assignment-indicating flag for the logical address "1" in response to the recovered address cancel answer signal La. Specifically, the microcomputer 10 erases the data from the memory 20 which represents that the logical address "1" has been assigned to the IC card "A". In this way, the assignment of the logical address "1" to the IC card "A" is canceled.

Subsequently, the microcomputer 10 in the reader/writer RW assigns the logical address "1" to the IC card "C" as follows. The microcomputer 10 reads out the data from the memory 20 which represents the logical address "1" and the ID code word (the ID information) of the IC card "C". The microcomputer 10 generates a selection requirement signal Srwc for the IC card "C" in response to the readout data. As shown in FIG. 8, the selection requirement signal Srwc has a sequence of the selection command, the logical address "1", and the ID information of the IC card "C". The microcomputer 10 outputs the selection requirement signal Srwc to the modulation circuit 30. The modulation circuit 30 converts the selection requirement signal Srwc into a corresponding command radio signal referred to as a seventh command radio signal. The modulation circuit 30 outputs the seventh command radio signal to the antenna 40. The seventh command radio signal is radiated by the antenna 40, being transmitted from the reader/writer RW.

In the IC card "C", the seventh command radio signal is received by the antenna 60. The received seventh command radio signal is fed from the antenna 60 to the demodulation circuit 80. The demodulation circuit 80 recovers the selection requirement signal Srwc from the received seventh command radio signal. The demodulation circuit 80 outputs the recovered selection requirement signal Srwc to the microcomputer 100. The microcomputer 100 detects that the recovered selection requirement signal Srwc is directed to the IC card "C" on the basis of the ID information in the recovered selection requirement signal Srwc. In addition, the microcomputer 100 decides, from the recovered selection requirement signal Srwc, that the logical address "1" is assigned to the related IC card (the IC card "C"). The microcomputer 100 generates data representing that the logical address "1" is assigned to the related IC card (the IC card "C"). The microcomputer 100 writes the generated data into the memory 90. Furthermore, the microcomputer 100 generates an assignment answer signal Sc in response to the selection requirement signal Srwc. As shown in FIG. 8, the assignment answer signal Sc has a sequence of the assignment response code word and the logical address "1". The microcomputer 100 outputs the assignment answer signal Sc to the modulation circuit 110. The modulation circuit 110 converts the assignment answer signal Sc into a corresponding radio answer signal RTc. The modulation circuit 110 feeds the radio answer signal RTc to the antenna 60. The antenna 60 radiates and transmits the radio answer signal RTc.

The antenna 40 in the reader/writer RW receives the radio answer signal RTc from the IC card "C". In the reader/writer RW, the received radio answer signal RTc is fed from the antenna 40 to the demodulation circuit 50. The demodulation circuit 50 recovers the assignment answer signal Sc from the received radio answer signal RTc. The demodulation circuit 50 outputs the recovered assignment answer signal Sc to the microcomputer 10. The microcomputer 10 sets the assignment-indicating flag for the logical address "1" in response to the recovered assignment answer signal Sc. Specifically, the microcomputer 10 generates data representing that the logical address "1" has been assigned to the IC card "C". The microcomputer 10 writes the generated data into the memory 20.

Subsequently, the microcomputer 10 in the reader/writer RW implements steps of controlling the IC card "C" as follows. The microcomputer 10 generates a read requirement signal Rrwc for the IC card "C". As shown in FIG. 8, the read requirement signal Rrwc has a sequence of the read command, the logical address "1", and read requirement information. The microcomputer 10 outputs the read requirement signal Rrwc to the modulation circuit 30. The modulation circuit 30 converts the read requirement signal Rrwc into a corresponding command radio signal referred to as an eighth command radio signal. The modulation circuit 30 outputs the eighth command radio signal to the antenna 40. The eighth command radio signal is radiated by the antenna 40, being transmitted from the reader/writer RW.

In the IC card "C", the eighth command radio signal is received by the antenna 60. The received eighth command radio signal is fed from the antenna 60 to the demodulation circuit 80. The demodulation circuit 80 recovers the read requirement signal Rrwc from the received eighth command radio signal. The demodulation circuit 80 outputs the recovered read requirement signal Rrwc to the microcomputer 100. The microcomputer 100 detects that the logical address represented by the recovered read requirement signal Rrwc agrees with the logical address "1" assigned to the related IC card (the IC card "C"). Thus, the microcomputer 100 recognizes that the recovered read requirement signal Rrwc is directed to the related IC card (the IC card "C"). Subsequently, the microcomputer 100 reads out data from the memory 90 in response to the read command and the read requirement information represented by the recovered read requirement signal Rrwc. Specifically, the readout data is designated by the read requirement information. The microcomputer 100 uses the readout data as read information. The microcomputer 100 generates a read answer signal Rc. As shown in FIG. 8, the read answer signal Rc has a sequence of the read response code word, the logical address "1", and the read information. The microcomputer 100 outputs the read answer signal Rc to the modulation circuit 110. The modulation circuit 110 converts the read answer signal Rc into a corresponding radio answer signal RUc. The modulation circuit 110 feeds the radio answer signal RUc to the antenna 60. The antenna 60 radiates and transmits the radio answer signal RUc.

The antenna 40 in the reader/writer RW receives the radio answer signal RUc from the IC card "C". In the reader/writer RW, the received radio answer signal RUc is fed from the antenna 40 to the demodulation circuit 50. The demodulation circuit 50 recovers the read answer signal Rc from the received radio answer signal RUc. The demodulation circuit 50 outputs the recovered read answer signal Rc to the microcomputer 10. The microcomputer 10 extracts the read information from the recovered read answer signal Rc. The microcomputer 10 writes the read information into the memory 20 as readout data.

Figure 4:
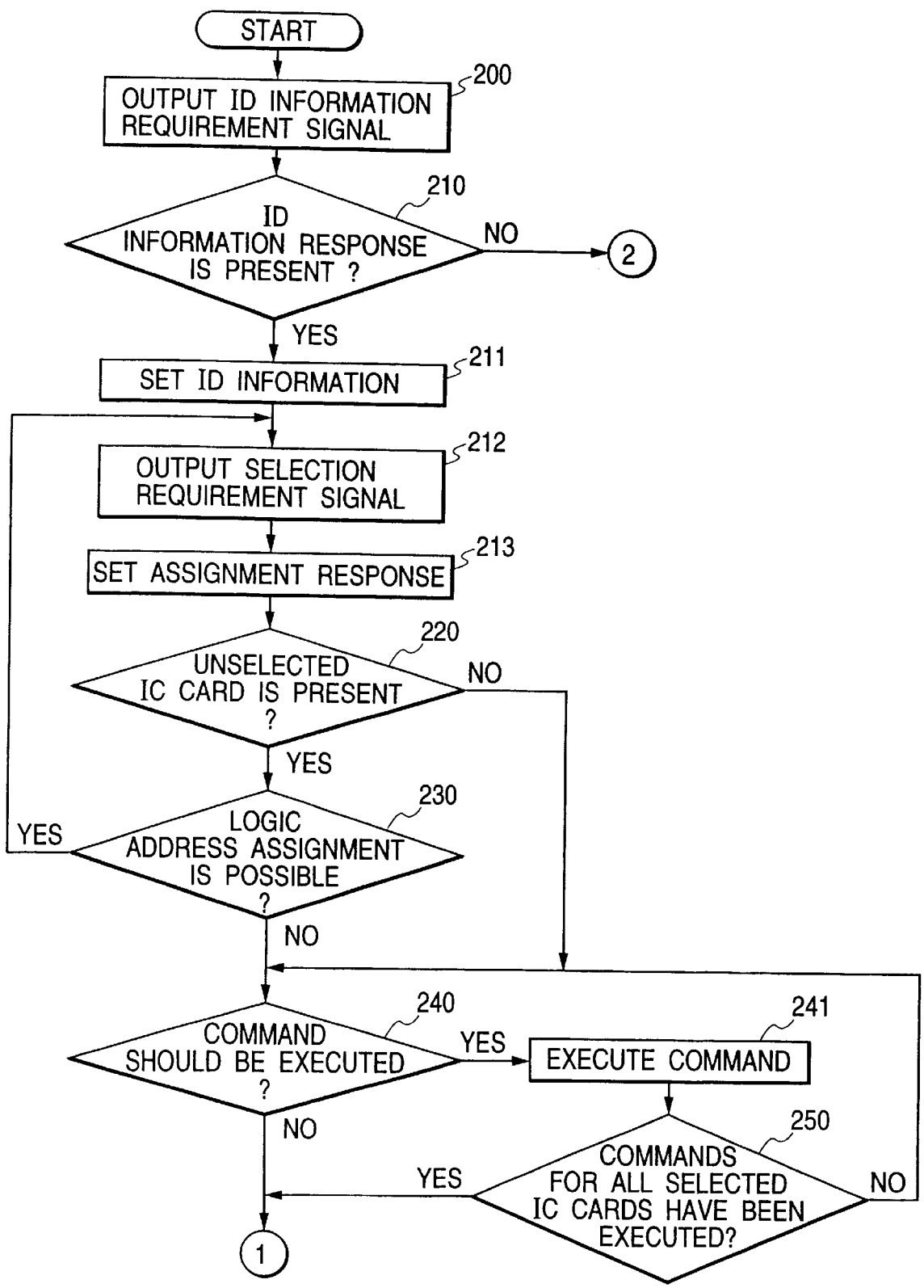
FIGS. 4 and 5 are a flowchart of a program for a microcomputer in the reader/writer of FIG. 2.
Figure 5:
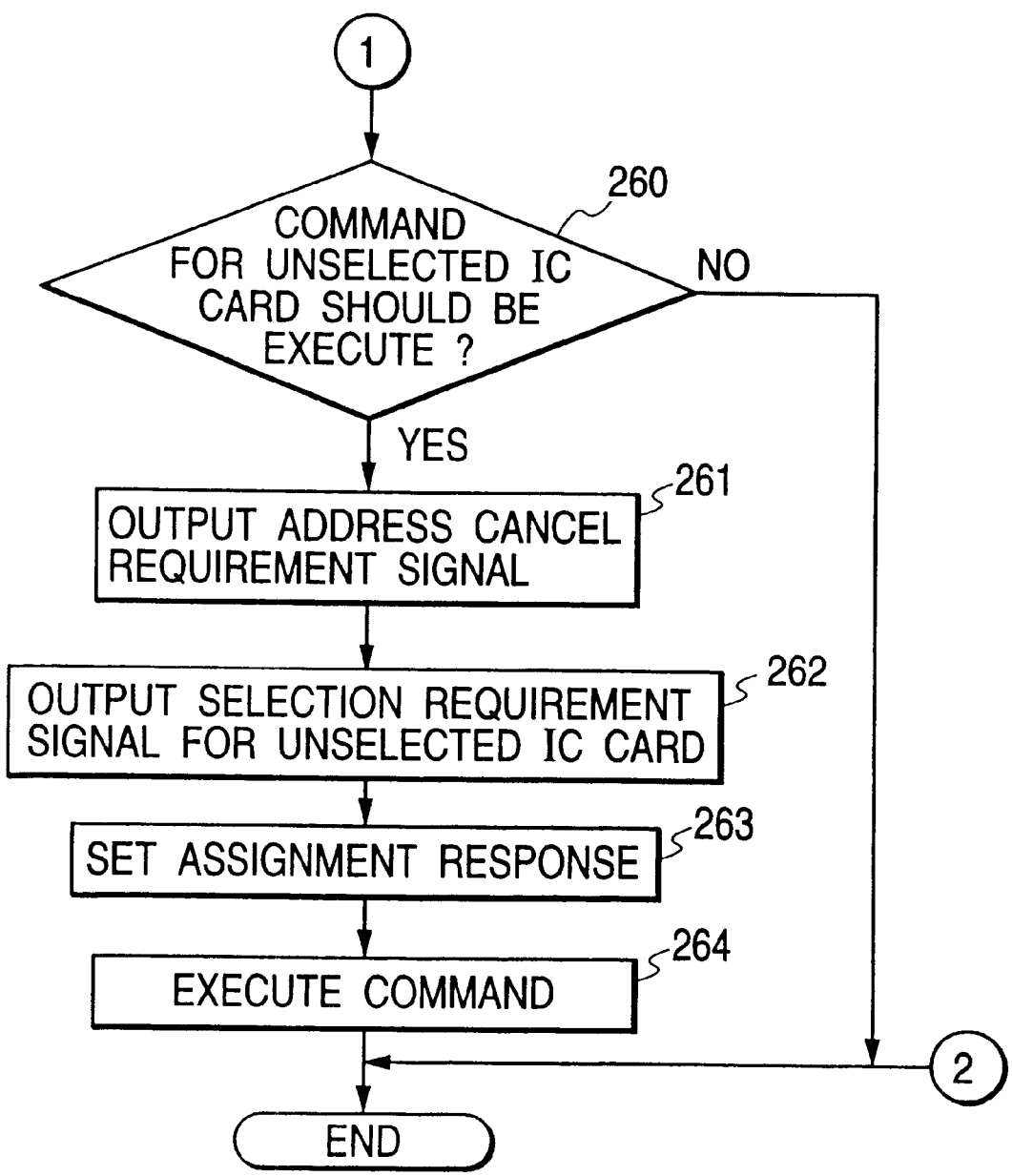

As previously indicated, the microcomputer 10 in the reader/writer RW operates in accordance with a program stored in its internal ROM. FIGS. 4 and 5 are a flowchart of the program in the microcomputer 10.

As shown in FIG. 4, a first step 200 of the program outputs an ID information requirement signal Drw to the modulation circuit 30. After the step 200, the program advances to a step 210.

The step 210 decides whether or not at least one ID information answer signal is present during a given time interval from the moment of the outputting of the ID information requirement signal Drw. When at least one ID information answer signal is present, the program advances from the step 210 to a step 211. Otherwise, the program exits from the step 210, and then the current execution cycle of the program ends (see FIG. 5).

The step 211 sets flags for ID code words represented by the ID information answer signals respectively. The step 211 writes signals (data) of the ID code words into the memory 20 as IC-card ID information. After the step 211, the program advances to a step 212.

The step 212 reads out the data from the memory 20 which represents the logical address "1" and the ID code word (the ID information) of the first IC card, for example, the IC card "A". The step 212 generates a selection requirement signal Srwa for the first IC card (the IC card "A") in response to the readout data. The step 212 outputs the selection requirement signal Srwa to the modulation circuit 30.

A step 213 following the step 212 awaits an assignment answer signal Sa which is responsive to the selection requirement signal Srwa. The step 213 sets an assignment-indicating flag for the logical address "1" when detecting the assignment answer signal Sa. Specifically, in response to the assignment answer signal Sa, the step 213 generates data representing that the logical address "1" has been assigned to the first IC card (the IC card "A"). The step 213 writes the generated data into the memory 20. Thus, the assignment of the logical address "1" to the first IC card (the IC card "A") is completed.

A step 220 subsequent to the step 213 decides whether or not there is at least one IC card to which a logical address has not been assigned yet. When there is at least one IC card to which a logical address has not been assigned yet, the program advances from the step 220 to a step 230. Otherwise, the program jumps from the step 220 to a step 240.

The step 230 decides whether or not the assignment of a logical address to a remaining IC card is possible. When the assignment of a logical address to a remaining IC card is possible, the program returns from the step 230 to the step 212. Otherwise, the program advances from the step 230 to the step 240.

In the case where the assignment of the logical address "2" to the second IC card (for example, the IC card "B") is possible, the program returns from the step 230 to the step 212. In this case, the step 212 reads out the data from the memory 20 which represents the logical address "2" and the ID code word (the ID information) of the second IC card, for example, the IC card "B". The step 212 generates a selection requirement signal Srwb for the second IC card (the IC card "B") in response to the readout data. The step 212 outputs the selection requirement signal Srwb to the modulation circuit 30.

The step 213 which follows the step 212 awaits an assignment answer signal Sb responding to the selection requirement signal Srwb. The step 213 sets an assignment-indicating flag for the logical address "2" when detecting the assignment answer signal Sb. Specifically, in response to the assignment answer signal Sb, the step 213 generates data representing that the logical address "2" has been assigned to the second IC card (the IC card "B"). The step 213 writes the generated data into the memory 20. Thus, the assignment of the logical address "2" to the second IC card (the IC card "B") is completed.

The step 220 subsequent to the step 213 decides whether or not there is at least one IC card to which a logical address has not been assigned yet. When there is at least one IC card to which a logical address has not been assigned yet, the program advances from the step 220 to the step 230. Otherwise, the program jumps from the step 220 to the step 240.

The step 230 decides whether or not the assignment of a logical address to a remaining IC card is possible. When the assignment of a logical address to a remaining IC card is possible, the program returns from the step 230 to the step 212. Otherwise, the program advances from the step 230 to the step 240.

In the case where the logical addresses "1" and "2" have been assigned to the first and second IC cards (the IC cards "A" and "B") respectively, the program advances from the step 230 to the step 240.

The step 240 decides whether or not the execution of a command to control the first IC card (the IC card "A") is required. When the execution of the command to control the first IC card (the IC card "A") is required, the program advances from the step 240 to a step 241. In addition, the step 240 decides whether or not the execution of a command to control the second IC card (the IC card "B") is required. When the execution of the command to control the second IC card (the IC card "B") is required, the program advances from the step 240 to the step 241. When neither the execution of the command to control the first IC card (the IC card "A") nor the execution of the command to control the second IC card (the IC card "B") is required, the program advances from the step 240 to a step 260 in FIG. 5.

The step 241 executes the command to control the first IC card (the IC card "A") or the command to control the second IC card (the IC card "B"). In the case of the execution of the command to control the first IC card (the IC card "A"), the step 241 generates a read requirement signal Rrwa for the first IC card. The step 241 outputs the read requirement signal Rrwa to the modulation circuit 30. In the case of the execution of the command to control the second IC card (the IC card "B"), the step 241 generates a read requirement signal Rrwb for the second IC card. The step 241 outputs the read requirement signal Rrwb to the modulation circuit 30. In addition, the step 241 awaits a read answer signal Ra or Rb which is responsive to the read requirement signal Rrwa or Rrwb. Upon the detection of the read answer signal Ra or Rb, the step 241 extracts the read information from the read answer signal Ra or Rb. The step 241 writes the read information into the memory 20 as readout data.

A step 250 following the step 241 decides whether or not the execution of all the commands to control the respective address-assigned IC cards has been completed. When the execution of all the commands has been completed, the program advances from the step 250 to the step 260 in FIG. 5. Otherwise, the program returns from the step 250 to the step 240.

The step 260 decides whether or not a command to control the remaining IC card (the third IC card, for example, the IC card "C"), to which any logical address has not been assigned yet, is required to be executed. When the command to control the third IC card is required to be executed, the program advances from the step 260 to a step 261. Otherwise, the program exits from the step 260, and then the current execution cycle of the program ends.

The step 261 generates an address cancel requirement signal Lrw for the fist IC card (the IC card "A") to which the logical address "1" has been assigned. The step 261 outputs the address cancel requirement signal Lrw to the modulation circuit 30. In addition, the step 261 awaits an address cancel answer signal La which is responsive to the address cancel requirement signal Lrw. The step 261 resets the assignment-indicating flag for the logical address "1" when detecting the address cancel answer signal La. Specifically, the step 261 erases the data from the memory 20 which represents that the logical address "1" has been assigned to the first IC card (the IC card "A").

A step 262 subsequent to the step 261 reads out the data from the memory 20 which represents the logical address "1" and the ID code word (the ID information) of the third IC card, for example, the IC card "C". The step 262 generates a selection requirement signal Srwc for the third IC card (the IC card "C") in response to the readout data. The step 262 outputs the selection requirement signal Srwc to the modulation circuit 30.

A step 263 following the step 262 awaits an assignment answer signal Sc which is responsive to the selection requirement signal Srwc. The step 263 sets the assignment-indicating flag for the logical address "1" when detecting the assignment answer signal Sc. Specifically, in response to the assignment answer signal Sc, the step 263 generates data representing that the logical address "1" has been assigned to the third IC card (the IC card "C"). The step 263 writes the generated data into the memory 20. Thus, the assignment of the logical address "1" to the third IC card (the IC card "C") is completed.

A step 264 subsequent to the step 263 executes a command to control the third IC card (the IC card "C"). Specifically, the step 264 generates a read requirement signal Rrwc for the third IC card. The step 264 outputs the read requirement signal Rrwc to the modulation circuit 30. In addition, the step 264 awaits a read answer signal Rc which is responsive to the read requirement signal Rrwc. When the read answer signal Rc is received, the step 264 extracts the read information from the read answer signal Rc. The step 264 writes the read information into the memory 20 as readout data. After the step 264, the current execution cycle of the program ends.

Figure 6:
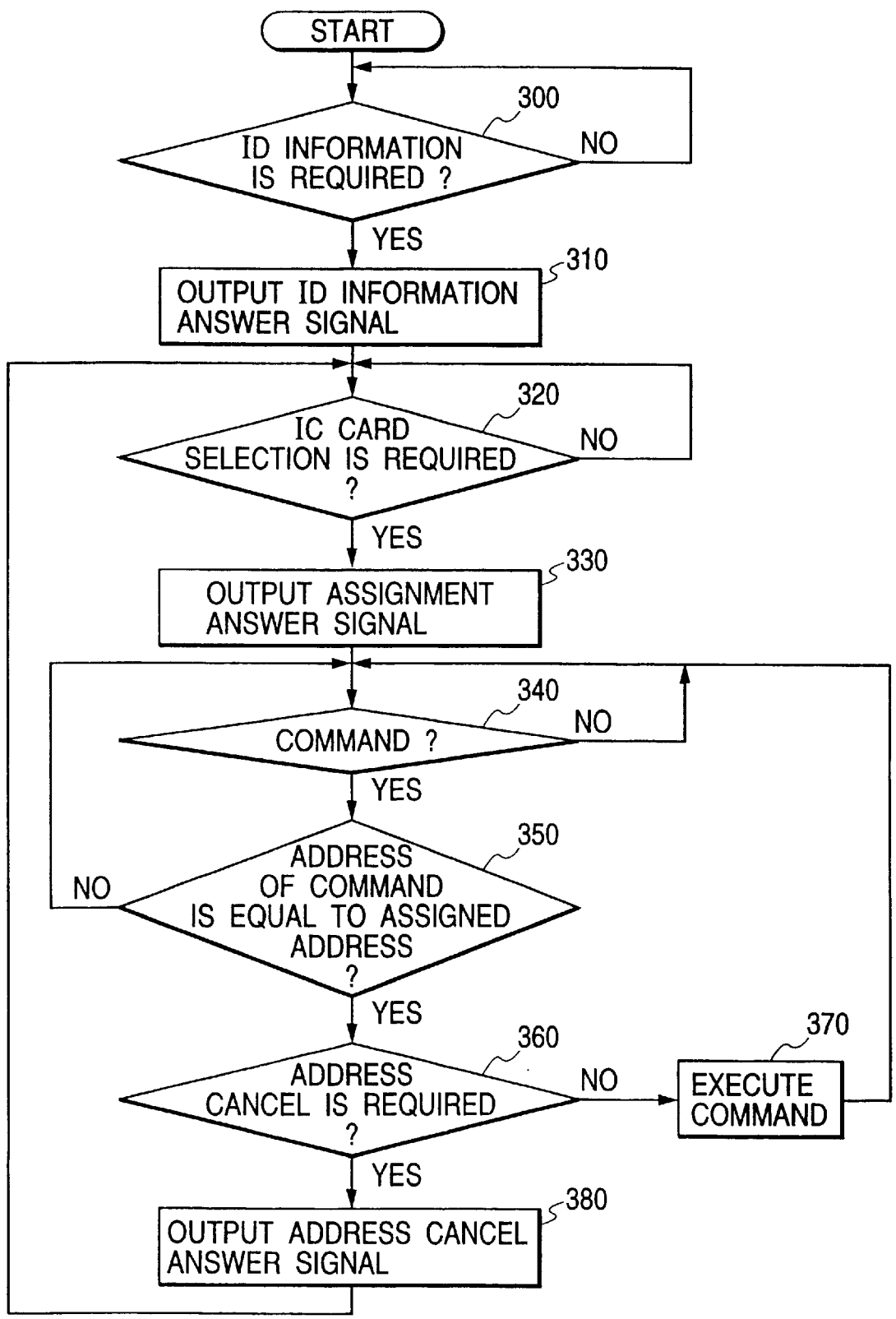
FIG. 6 is a flowchart of a program for a microcomputer in the IC card of FIG. 3.

As previously indicated, the microcomputer 100 in the IC card "A" operates in accordance with a program stored in its internal ROM. FIG. 6 is a flowchart of the program in the microcomputer 100.

As shown in FIG. 6, a first step 300 of the program decides whether or not an ID information requirement signal Drw is present. When the ID information requirement signal Drw is present, the program advances from the step 300 to a step 310. Otherwise, the step 300 is repeated.

The step 310 reads out the ID data from the memory 90. The step 310 generates an ID information answer signal Da from the readout data. The step 310 outputs the ID information answer signal Da to the modulation circuit 110. After the step 310, the program advances to a step 320.

The step 320 decides whether or not a selection requirement signal Srwa directed to the IC card "A" is present by referring to the ID code word (the ID information) in the selection requirement signal Srwa. When the selection requirement signal Srwa is present, the program advances from the step 320 to a step 330. Otherwise, the step 320 is repeated.

The step 330 decides, from the recovered selection requirement signal Srwa, that the logical address "1" is assigned to the IC card "A". The step 330 generates data representing that the logical address "1" is assigned to the IC card "A". The step 330 writes the generated data into the memory 90. Furthermore, the step 330 generates an assignment answer signal Sa in response to the selection requirement signal Srwa. The step 330 outputs the assignment answer signal Sa to the modulation circuit 110. After the step 330, the program advances to a step 340.

The step 340 decides whether or not a command to control an IC card (for example, the IC card "A") is present. An example of the command is a read requirement signal (a read requirement signal Rrwa). When the command is present, the program advances from the step 340 to a step 350. Otherwise, the step 340 is repeated.

The step 350 decides whether or not the logical address represented by the command (for example, the read requirement signal) agrees with the logical address "1" assigned to the IC card "A". In other words, the step 350 decides whether or not the command is directed to the IC card "A". When the logical address represented by the command agrees with the logical address "1", that is, when the command is directed to the IC card "A", the program advances from the step 350 to a step 360. Otherwise, the program returns from the step 350 to the step 340.

The step 360 decides whether the command is equal to or different from an address cancel requirement signal Lrw. When the command is different from the address cancel requirement signal Lrw, the program advances from the step 360 to a step 370. When the command is equal to the address cancel requirement signal Lrw, the program advances from the step 360 to a step 380.

The step 370 executes the command. In the case where the command is equal to the read requirement signal Rrwa, the step 370 reads out data from the memory 90 in response to the read command and the read requirement information represented by the read requirement signal Rrwa. Specifically, the readout data is designated by the read requirement information. The step 370 uses the readout data as read information. The step 370 generates a read answer signal Ra. The step 370 outputs the read answer signal Ra to the modulation circuit 110. After the step 370, the program returns to the step 340.

The step 380 cancels the assignment of the logical address "1" to the IC card "A" in response to the address cancel signal Lrw. Specifically, the step 380 erases the data from the memory 90 which represents that the logical address "1" is assigned to the IC card "A". In addition, the step 380 generates an address cancel answer signal La. The step 380 outputs the address cancel answer signal La to the modulation circuit 110. After the step 380, the program returns to the step 320.

The telephone set on which the reader/writer RW is provided may be replaced by a dispenser or an automatic vending machine.

The microcomputers 10 and 100 may be replaced by exclusive control circuits composed of discrete analog circuits or discrete digital circuits.

At least part of the combination of the microcomputer 10, the memory 20, the modulation circuit 30, and the demodulation circuit 50 may be formed by a single IC chip.

At least part of the combination of the memory 90, the microcomputer 100, the power supply circuit 70, the modulation circuit 110, and the demodulation circuit 80 may be formed by a single IC chip.

What is claimed is:

1. A contactless IC card control system comprising:
reader/writer means for sending a request for identification information from a plurality of IC cards;
IC card means for sending respective identification information in response to the request by said reader/writer means;
means for assigning logical addresses to some of said IC cards and for selecting said some of said IC cards in response to the identification information sent by said IC card means;
means for controlling said some of said IC cards;
means for transmitting an address cancel requirement signal from the reader/writer means to one of said some of said IC cards;
means for canceling a logical address assigned to said one of said some of said IC cards in response to said address cancel requirement signal; and
means for reassigning the canceled logical address to an IC card among the plurality of IC cards to which a logical address has not yet been assigned,
wherein said controlling means controls the IC card to which the logical address has been reassigned after said canceled logical address has been reassigned.

2. A method of controlling contactless IC cards, comprising:
sending a request by a reader/writer for identification information from a plurality of IC cards;
sending respective identification information from the plurality of IC cards in response to the request by said reader/writer;
assigning logical addresses to some of said IC cards and selecting said some of said IC cards in response to the identification information sent by the plurality of IC cards;
controlling said some of said IC cards;
transmitting an address cancel requirement signal from the reader/writer to one of said some of said IC cards:
canceling a logical address assigned to said one of said some of said IC cards in response to said address cancel requirement signal;
reassigning the canceled logical address to an IC card among the plurality of IC cards to which a logical address has not yet been assigned; and controlling the IC card to which the logical address has been reassigned after said canceled logical address has been reassigned.

3. A contactless IC card control system comprising:

a reader/writer including a memory and providing a radio-communication service area;

IC cards including first, second, and third IC cards different from each other, wherein each of the first, second, and third IC cards includes a memory;

means provided in the reader/writer for generating first information representing that a first logical address is assigned to the first IC card;

means for transmitting the first information from the reader/writer to the first IC card by radio;

means provided in the first IC card for storing the first information into the memory in the first IC card;

means provided in the reader/writer for storing the first information into the memory in the reader/writer to complete assignment of the first logical address to the first IC card;

means provided in the reader/writer for generating second information representing that a second logical address different from the first logical address is assigned to the second IC card;

means for transmitting the second information from the reader/writer to the second IC card by radio;

means provided in the second IC card for storing the second information into the memory in the second IC card;

means provided in the reader/writer for storing the second information into the memory in the reader/writer to complete assignment of the second logical address to the second IC card;

means provided in the reader/writer for generating an address cancel requirement signal;

means for transmitting the address cancel requirement signal from the reader/writer to the first IC card by radio when the first IC card is in the radio-communication service area provided by the reader/writer;

means provided in the first IC card for erasing the first information from the memory in the first IC card in response to the address cancel requirement signal;

means provided in the reader/writer for erasing the first information from the memory in the reader/writer to complete cancel of assignment of the first logical address to the first IC card;

means provided in the reader/writer for, after cancel of assignment of the first logical address to the first IC card is completed, generating third information representing that the first logical address is assigned to the third IC card;

means for transmitting the third information from the reader/writer to the third IC card by radio;

means provided in the third IC card for storing the third information into the memory in the third IC card; and means provided in the reader/writer for storing the third information into the memory in the reader/writer to complete assignment of the first logical address to the third IC card.

* * * * *

UNITED STATES PATENT AND TRADEMARK OFFICE
CERTIFICATE OF CORRECTION

PATENT NO.    : 6,352,202 B2
DATED         : March 5, 2002
INVENTOR(S)   : Takiguchi et al.

It is certified that error appears in the above-identified patent and that said Letters Patent is hereby corrected as shown below:

<u>Title page,</u>
Item [73], Assignee, change "DENSO Corporation, Kariya (JP)" to
-- DENSO CORPORATION, Kariya (JP); NIPPON TELEGRAPH AND TELEPHONE CORPORATION, Tokyo (JP); HITACHI LTD., Tokyo (JP); TOKIN CORPORATION, Sendai (JP) --

Signed and Sealed this

First Day of October, 2002

*Attest:*

*Attesting Officer*

JAMES E. ROGAN
*Director of the United States Patent and Trademark Office*